(12) United States Patent
Li et al.

(10) Patent No.: US 9,669,383 B2
(45) Date of Patent: Jun. 6, 2017

(54) CARBON NANOTUBE SPONGE

(71) Applicants: Tsinghua University, Beijing (CN); HON HAI PRECISION INDUSTRY CO., LTD., New Taipei (TW)

(72) Inventors: Meng-Ya Li, Beijing (CN); Yang Wu, Beijing (CN); Shu Luo, Beijing (CN); Jia-Ping Wang, Beijing (CN); Kai-Li Jiang, Beijing (CN); Shou-Shan Fan, Beijing (CN)

(73) Assignees: Tsinghua University, Beijing (CN); HON HAI PRECISION INDUSTRY CO., LTD., New Taipei (TW)

( * ) Notice: Subject to any disclaimer, the term of this patent is extended or adjusted under 35 U.S.C. 154(b) by 230 days.

(21) Appl. No.: 14/713,313

(22) Filed: May 15, 2015

(65) Prior Publication Data

US 2015/0258526 A1 Sep. 17, 2015

Related U.S. Application Data

(63) Continuation of application No. 14/096,533, filed on Dec. 4, 2013, now Pat. No. 9,102,537.

(30) Foreign Application Priority Data

Aug. 27, 2013 (CN) .......................... 2013 1 0377860

(51) Int. Cl.
*C01B 31/02* (2006.01)
*B01J 20/22* (2006.01)
(Continued)

(52) U.S. Cl.
CPC .......... *B01J 20/22* (2013.01); *B01J 20/28045* (2013.01); *B01J 20/28061* (2013.01);
(Continued)

(58) Field of Classification Search
CPC .. B01J 21/185; C01B 31/0206; C01B 31/022; C01B 2202/08
See application file for complete search history.

(56) References Cited

U.S. PATENT DOCUMENTS

| | | |
|---|---|---|
| 2003/0039604 A1 | 2/2003 | Niu et al. |
| 2011/0124790 A1 | 5/2011 | Penicaud |

(Continued)

FOREIGN PATENT DOCUMENTS

| | | |
|---|---|---|
| CN | 102276867 | 12/2011 |
| JP | 2004-535349 | 11/2004 |

(Continued)

OTHER PUBLICATIONS

Stein, Benjamin Emmanuel. Growth and applications of carbon nanotube-based nanosponge sheets. Diss. University of Hawaii at Manoa, 2012.*

*Primary Examiner* — Richard M Rump
(74) *Attorney, Agent, or Firm* — Steven Reiss

(57) ABSTRACT

The present disclosure relates to a carbon nanotube sponge comprising: a plurality of carbon nanotubes combined by van der Waals force to form a free-standing structure, wherein a plurality of micropores are defined by adjacent carbon nanotubes; and a plurality of carboxyl groups and hydroxyl groups located on surfaces of the plurality of carbon nanotubes; wherein a weight percentage of the carboxyl groups in the carbon nanotube sponge ranges from about 10% to about 20%, and a weight percentage of the hydroxyl groups in the carbon nanotube sponge ranges from about 5% to about 15%.

7 Claims, 7 Drawing Sheets

(51) Int. Cl.
*B01J 21/18* (2006.01)
*B01J 20/28* (2006.01)

(52) U.S. Cl.
CPC ....... *B01J 20/28085* (2013.01); *B01J 21/185* (2013.01); *C01B 31/022* (2013.01)

(56) References Cited

U.S. PATENT DOCUMENTS

2013/0087941 A1    4/2013   Chang et al.
2014/0012034 A1    1/2014   Shaffer et al.

FOREIGN PATENT DOCUMENTS

| JP | 2011-504446 | 2/2011 |
| TW | 201315679 | 4/2013 |
| WO | WO2012098345 | 7/2012 |

\* cited by examiner

```
┌─────────────────────────────────────────┐
│ Providing a carbon nanotube film        │
│ structure and an oxidizing solution,    │
│ wherein the carbon nanotube film        │
│ structure includes a number of carbon   │
│ nanotubes combined firmly to form a     │
│ free-standing structure, and the        │
│ oxidizing solution is formed by an      │
│ oxidizing agent and hydrogen peroxide   │
└─────────────────────────────────────────┘
                    │
                    ▼
┌─────────────────────────────────────────┐
│ Soaking the carbon nanotube film        │
│ structure in the oxidizing solution to  │
│ form a preform; and                     │
└─────────────────────────────────────────┘
                    │
                    ▼
┌─────────────────────────────────────────┐
│ Freeze-drying the preform under vacuum  │
│ condition                               │
└─────────────────────────────────────────┘
```

FIG. 1

CARBON NANOTUBE SPONGE

CROSS-REFERENCE TO RELATED APPLICATIONS

This application is a continuation of U.S. patent application Ser. No. 14/096,533, filed on Dec. 4, 2013, entitled, "CARBON NANOTUBE SPONGE AND METHOD FOR MAKING THE SAME", which claims all benefits accruing under 35 U.S.C. §119 from China Patent Application No. 201310377860.2, filed on Aug. 27, 2013 in the China Intellectual Property Office, the disclosure of which is incorporated herein by reference.

BACKGROUND

1. Technical Field

The present disclosure relates to carbon nanotube sponge and a method for making the same.

2. Description of Related Art

Carbon nanotubes are tubules of carbon generally having diameters ranging from 0.5 nanometers to 100 nanometers. Carbon nanotubes have recently attracted a great deal of attention for use in different applications such as field emitters, gas storage and separation, chemical sensors, and high strength composites, because of their thermal, electrical, and mechanical properties.

Because carbon nanotubes are microscopic structures, it is necessary to assemble the carbon nanotubes into macroscopic structures. A carbon nanotube film is one kind of macroscopic structure of carbon nanotubes. Recently, as disclosed by the pre-grant publication US20080248235 to Feng et al., a free-standing carbon nanotube film has been fabricated. The carbon nanotube film can be used in many different fields, such as filtration or adsorption.

However, the adsorption process of the carbon nanotube film is a kind of physical adsorption, and is relatively weak.

What is needed, therefore, is to provide a carbon nanotube sponge and a method for making the same, which can overcome the above-described shortcomings.

BRIEF DESCRIPTION OF THE DRAWINGS

Many aspects of the embodiments can be better understood with reference to the following drawings. The components in the drawings are not necessarily to scale, the emphasis instead being placed upon clearly illustrating the principles of the present disclosure. Moreover, in the drawings, like reference numerals designate corresponding parts throughout the several views.

FIG. 1 shows a flow chart of one embodiment of a method of making a carbon nanotube sponge.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Referring to FIG. 1, a method for making a carbon nanotube sponge according to one embodiment can include the following steps:

S10: providing a carbon nanotube film structure and an oxidizing solution, wherein the carbon nanotube film structure includes a number of carbon nanotubes combined firmly to form a free-standing structure, and the oxidizing solution is formed by an oxidizing agent and hydrogen peroxide;

S11: soaking the carbon nanotube film structure in the oxidizing solution to form a preform; and S12: freeze-drying the preform under vacuum condition.

In step (S11), the carbon nanotube film structure can be a free-standing structure, that is, the carbon nanotube film structure can support itself without a substrate. For example, if at least one point of the carbon nanotube film structure is held, the entire carbon nanotube film structure can be lifted without being damaged. The carbon nanotube film structure consists of a plurality of carbon nanotubes. Adjacent carbon nanotubes in the carbon nanotube film structure combine with each other by the van der Waals force therebetween. Pores and/or interspaces are defined in the carbon nanotube film and located between adjacent carbon nanotubes. A diameter of the pores and/or interspaces can be less than 10 micrometers.

Figure 2:
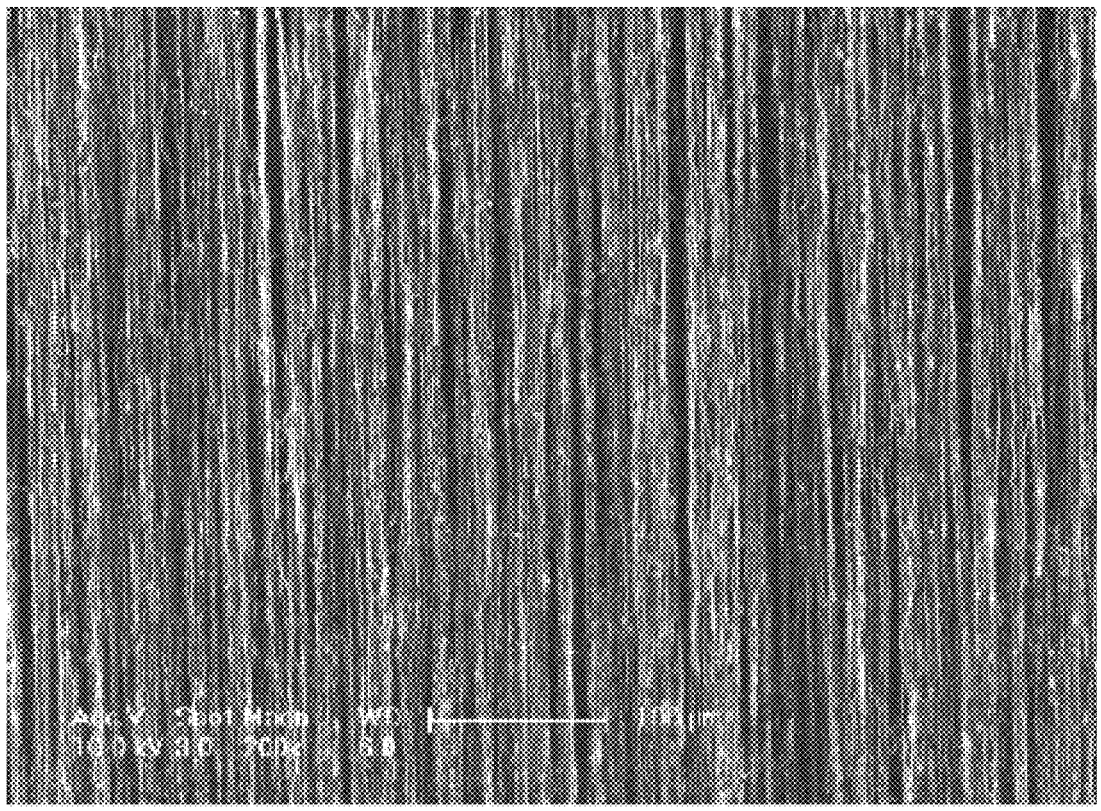
FIG. 2 is a Scanning Electron Microscope (SEM) image of a drawn carbon nanotube film.
Figure 3:
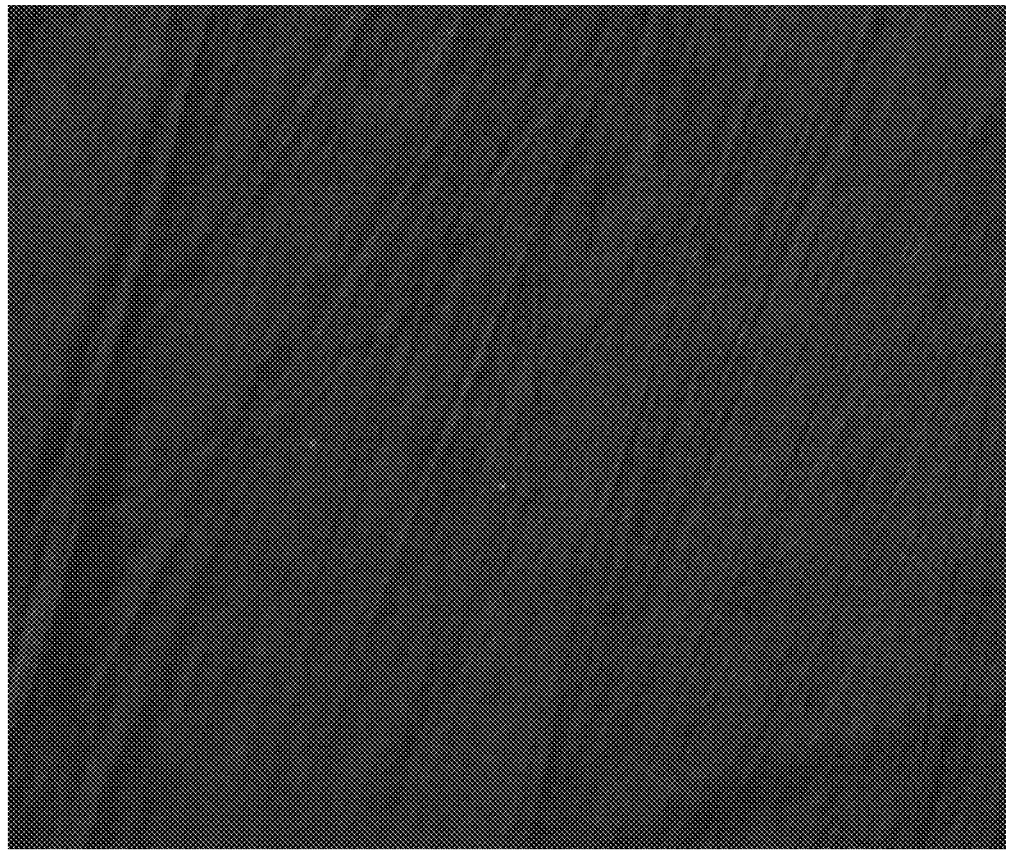
FIG. 3 is a microscope image of the drawn carbon nanotube film in FIG. 2.

The carbon nanotube film structure can include at least one carbon nanotube film. Referring to FIG. 2-3, the carbon nanotube film can be a drawn carbon nanotube film formed by drawing a film from a carbon nanotube array. In one embodiment, the carbon nanotube film structure includes one drawn carbon nanotube film. The drawn carbon nanotube film includes a plurality of carbon nanotubes. The plurality of carbon nanotubes in the drawn carbon nanotube film is arranged substantially parallel to a surface of the drawn carbon nanotube film. A large number of the carbon nanotubes in the drawn carbon nanotube film can be oriented along a preferred orientation, meaning that a large number of the carbon nanotubes in the drawn carbon nanotube film are arranged substantially along a same direction. An end of one carbon nanotube is joined to another end of an adjacent carbon nanotube arranged substantially along the same direction, by van der Waals force, to form a free-standing film. The term 'free-standing' includes films that do not have to be supported by a substrate. A small number of the carbon nanotubes are randomly arranged in the drawn carbon nanotube film, and have a small if not negligible effect on the larger number of the carbon nanotubes in the drawn carbon nanotube film, that are arranged substantially along the same direction. It can be appreciated that some variation can occur in the orientation of the carbon nanotubes in the drawn carbon nanotube film. Microscopically, the carbon nanotubes oriented substantially along the same direction may not be perfectly aligned in a straight line, and some curved portions may exist. It can be understood that contact between some carbon nanotubes located substantially side by side and oriented along the same direction cannot be totally excluded.

The drawn carbon nanotube film includes a plurality of successively oriented carbon nanotube segments joined end-to-end by van der Waals force therebetween. Each carbon nanotube segment includes a plurality of carbon nanotubes substantially parallel to each other, and joined by van der Waals force therebetween. The carbon nanotube segments can vary in width, thickness, uniformity, and shape. The carbon nanotubes in the drawn carbon nanotube film are also substantially oriented along a preferred orientation. The width of the drawn carbon nanotube film relates to the carbon nanotube array from which the drawn carbon nanotube film is drawn. Furthermore, the carbon nanotube film has an extremely large specific surface area, and is very sticky.

The carbon nanotube film structure can include more than one stacked drawn carbon nanotube film. An angle can exist between the oriented directions of the carbon nanotubes in adjacent films. Adjacent drawn carbon nanotube films can be combined by the van der Waals force therebetween without the need of an adhesive.

An angle between the oriented directions of the carbon nanotubes in two adjacent drawn carbon nanotube films can range from about 0 degrees to about 90 degrees. Pores and/or interspaces are defined between two adjacent carbon nanotubes in the drawn carbon nanotube film. The number of layers of the drawn carbon nanotube films in the carbon nanotube film structure is not limited; in some embodiments, the number of layers of the drawn carbon nanotube films in the carbon nanotube film structure is more than one hundred. In one embodiment, the carbon nanotube film structure includes 150 layers of stacked drawn carbon nanotube films.

Figure 4:
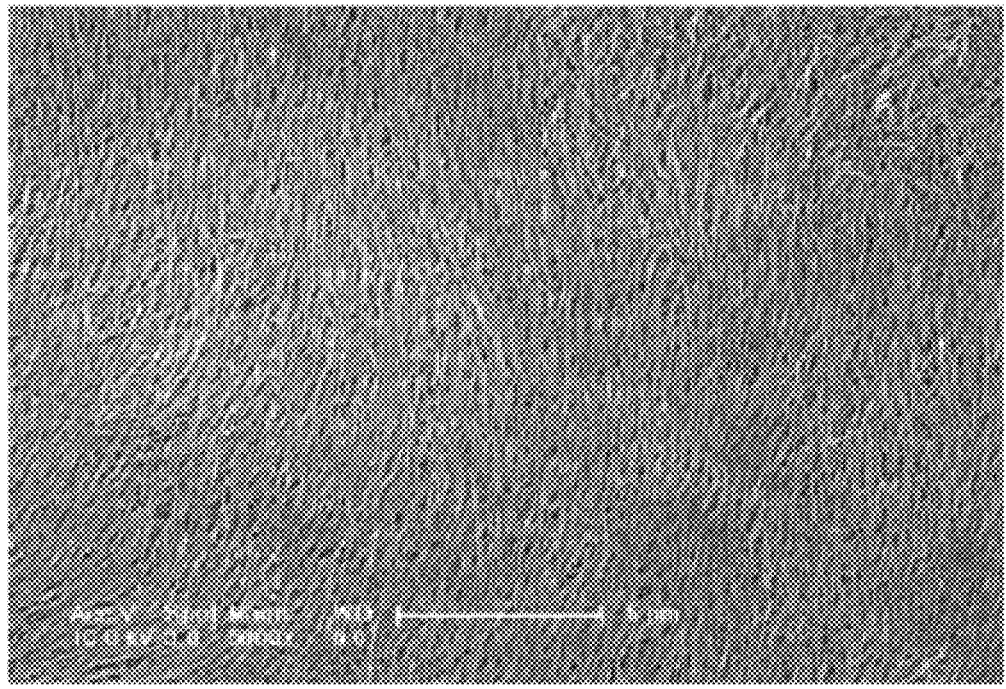
FIG. 4 is an SEM image of a pressed carbon nanotube film.

Referring to FIG. 4 the carbon nanotube film can also be a pressed carbon nanotube film formed by pressing a carbon nanotube array down on the substrate. The carbon nanotubes in the pressed carbon nanotube array can be arranged along a same direction or along different directions. The carbon nanotubes in the pressed carbon nanotube array can rest upon each other. Some of the carbon nanotubes in the pressed carbon nanotube film can protrude from a general surface/plane of the pressed carbon nanotube film. Pores and/or interspaces are defined between two adjacent carbon nanotubes in the pressed carbon nanotube film. Adjacent carbon nanotubes are attracted to each other and combined by van der Waals force. An angle between a primary alignment direction of the carbon nanotubes and a surface of the pressed carbon nanotube array is about 0 degrees to approximately 15 degrees. The greater the pressure applied, the smaller the angle obtained. When the carbon nanotubes in the pressed carbon nanotube array are arranged along different directions, the carbon nanotube structure can be isotropic. The thickness of the pressed carbon nanotube array can range from about 0.5 nm to about 1 millimeter. The length of the carbon nanotubes can be larger than 50 micrometers. Examples of the pressed carbon nanotube film are taught by US PGPub. 20080299031 A1 to Liu et al.

Figure 5:
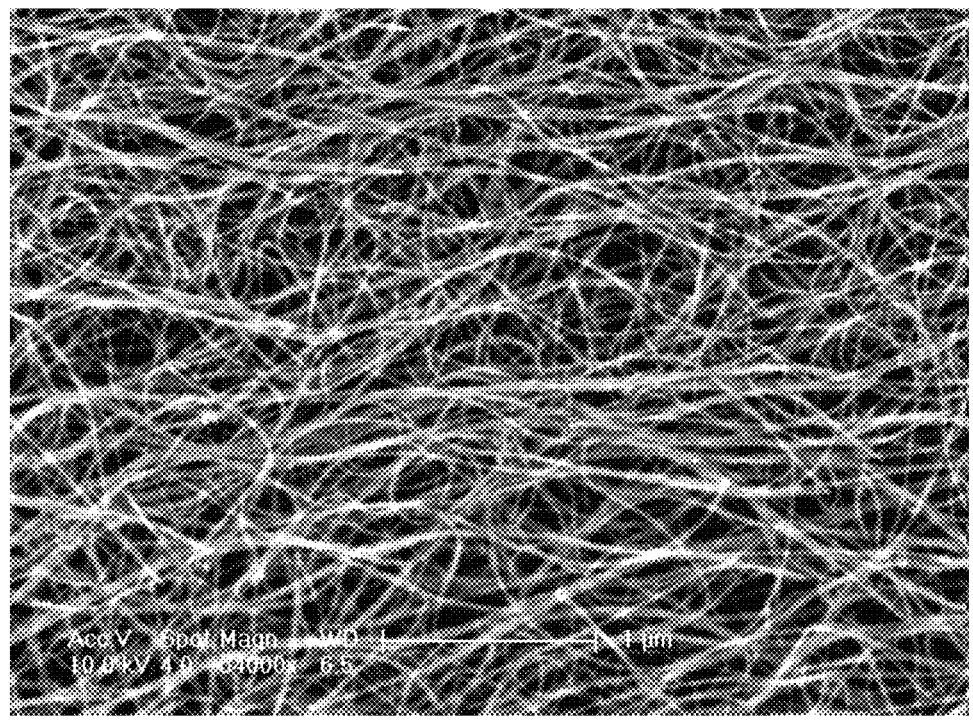
FIG. 5 is an SEM image of a flocculated carbon nanotube film.

Referring to FIG. 5, the carbon nanotube film can also be a flocculated carbon nanotube film formed by a flocculating method. The flocculated carbon nanotube film can include a plurality of long, curved, disordered carbon nanotubes entangled with each other. A length of the carbon nanotubes can be greater than 10 centimeters. In one embodiment, the length of the carbon nanotubes is in a range from about 200 micrometers to about 900 micrometers. The carbon nanotubes can be substantially uniformly distributed in the carbon nanotube film. The adjacent carbon nanotubes are acted upon by the van der Waals force therebetween. Some of the carbon nanotubes in the flocculated carbon nanotube film can protrude from a general surface/plane of flocculated carbon nanotube film. Pores and/or interspaces are defined between two adjacent carbon nanotubes in the flocculated carbon nanotube film.

The oxidizing agent is used to oxidize the carbon nanotubes, and then form a number of functional groups on the carbon nanotubes of the carbon nanotube film structure. The oxidizing agent can be nitric acid, concentrated sulfuric acid, hypochloric acid, chloric acid, chlorous acid, perchloric acid, nitrous acid, potassium permanganate, potassium dichromate, or other oxidizing material. In some embodiments, the oxidizing agent is concentrated sulfuric acid with a concentration 98% wt. A concentration of the hydrogen peroxide is not limited. In one embodiment, the concentration of the hydrogen peroxide is about 30% wt. A volume ratio between the hydrogen peroxide and concentrated sulfuric acid can range from about 1:2 to about 1:5. In some embodiments, the volume ratio between the hydrogen peroxide and concentrated sulfuric acid ranges from about 1:2 to about 1:3. In one embodiment, the volume ratio between the hydrogen peroxide and concentrated sulfuric acid is about 3:7.

In step S11, a period of soaking the carbon nanotube film structure in the oxidizing solution depends on the oxidizing ability of the oxidizing solution. That is, the greater of the oxidizing ability of the oxidizing solution is, the shorter the period of soaking the carbon nanotube film structure in the oxidizing solution is. In one embodiment, the period of soaking the carbon nanotube film structure in the oxidizing solution is about three days. In order to reduce the period of soaking process, a process of heating during the soaking process can be further carried out. A temperature of the heating process can be less than 100 degrees, to prevent the oxidizing solution from violently boiling.

During the soaking process, the oxidizing solution can diffuse in the carbon nanotube film structure and oxidize the carbon nanotubes to form a number of functional groups on the carbon nanotubes. Furthermore, the hydrogen peroxide can decompose to form oxygen. The oxygen can gather together and be adsorbed on surface of the carbon nanotubes to form a number of bubbles in the carbon nanotube film structure. The pores and/or interspaces in the carbon nanotube film structure can be enlarged by the bubbles, thus, to form a honeycomb shaped preform. A diameter of the pores and/or interspaces of the preform can be ten times larger than the diameter of the pores and/or interspaces of the carbon nanotube film structure. The diameter of the pores and/or interspaces of the preform can be greater than 100 micrometers. In some embodiments, the diameter of the pores and/or interspaces of the preform range from about 200 micrometers to about 500 micrometers. A volume of the preform can be two times larger than a volume of the carbon nanotube film structure.

After the preform is formed, Step 11 can further include an optional step 112 of applying a de-ionized water to wash away the oxidizing solution in the preform.

Step S12 includes sub-steps:

S122: placing the preform into a freeze drier, and vacuuming the freeze drier;

S124: rapidly cooling the preform to a temperature lower than −40° C., and keeping the temperature for about 1 hour to about 5 hours; and S126: increasing the temperature of the preform to room temperature in stages, a period of drying in different stages ranges from about 1 hour to about 10 hours.

In step S122, the freeze drier can be vacuumed to have a vacuum degree lower than 30 pa.

In step S124, in one embodiment, the preform is rapidly cooled to about −60 ° C., and the temperature is kept for about 1 hour.

In step S126, in one embodiment, the temperature of the preform is respectively kept at about −25 ° C. for about 2 hours, at about −20 ° C. for about 2 hours, at about −15 ° C. for about 2 hours, at about −10 ° C. for about 2 hours, at about −5 °C. for about 2 hours, at about −0 °C. for about 2 hours, at about 5 °C. for about 2 hours, at about 10 °C. for about 2 hours, then at about 15 °C. for about 2 hours; and finally the carbon nanotube sponge is taken out of the freeze drier and obtained. The freeze-drying process can prevent the preform from shrinking, thus obtaining the carbon nanotube sponge having a fluffy structure.

The method of making the carbon nanotube sponge is a simple process accomplished at relatively low cost.

Figure 6:
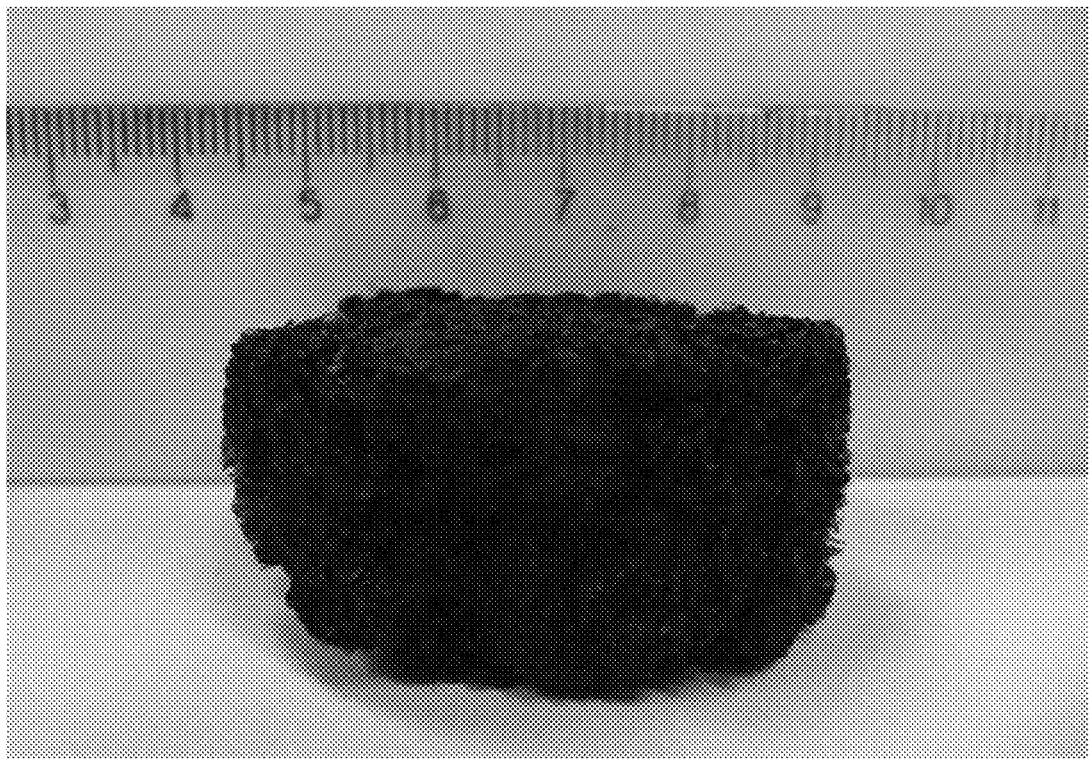
FIG. 6 is an image of one embodiment of the carbon nanotube sponge.
Figure 7:
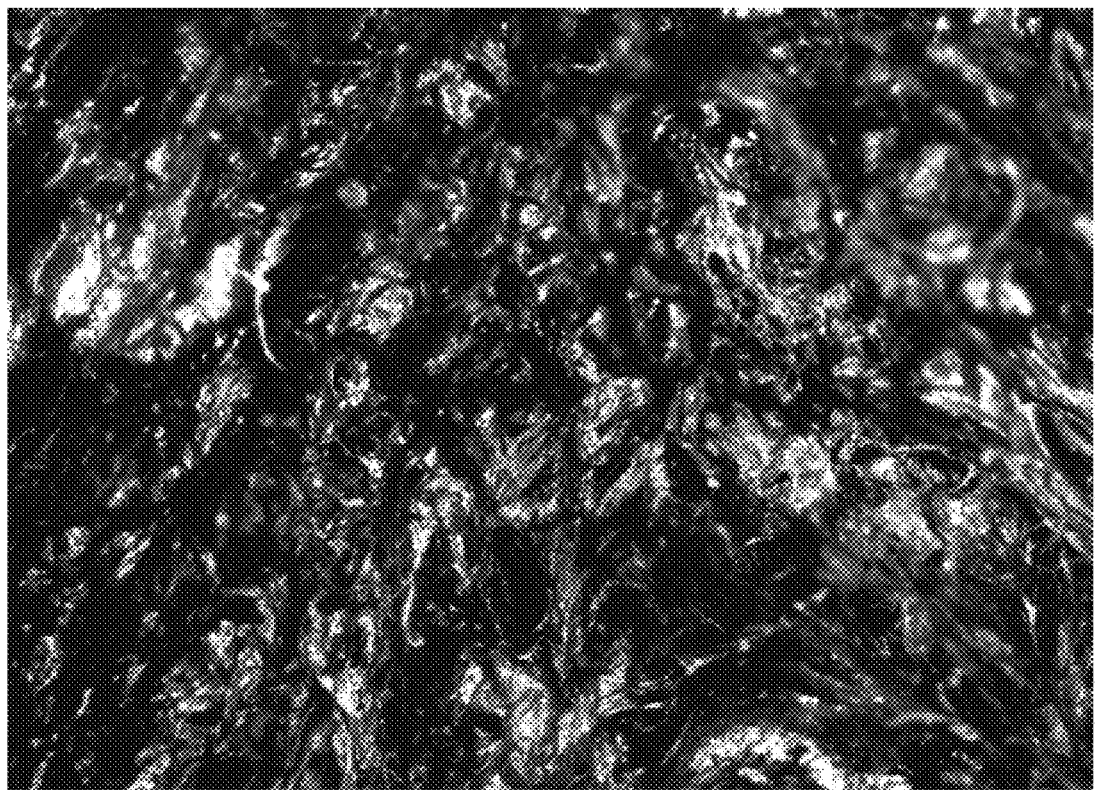
FIG. 7 is a microscope image of the carbon nanotube sponge in FIG. 6.

Referring to FIGS. 6, and 7, a carbon nanotube sponge, which can be made by the above described method, includes a number of carbon nanotubes and a number of functional groups located on surfaces of the carbon nanotubes. The carbon nanotube sponge is a honeycomb shaped structure having a number of micropores. A diameter of the micropores of the carbon nanotube sponge is greater than 100 micrometers. In some embodiments, the diameter of the micropores of the carbon nanotube sponge ranges from 200 micrometers to about 500 micrometers. The carbon nanotubes of the carbon nanotube sponge are combined by van der Waals force to form a free-standing structure. A weight percentage of the functional groups in the carbon nanotube sponge ranges from about 15% to about 35%. If the weight percentage of the functional groups in the carbon nanotube sponge is greater than 35%, the carbon nanotube sponge would be shrunk. The functional groups can be carboxyl groups or hydroxyl groups. A weight percentage of the carboxyl groups in the carbon nanotube sponge ranges from about 10% to about 20%. A weight percentage of the hydroxyl groups in the carbon nanotube sponge ranges from about 5% to about 15%. In one embodiment, the weight percentage of the carboxyl groups in the carbon nanotube sponge is about 12%, and the weight percentage of the hydroxyl groups in the carbon nanotube sponge is about 7%. A specific surface area of the carbon nanotube sponge is greater than 200 $m^2/g$, which is much greater than a specific surface area of the carbon nanotube film structure, such as 170 $m^2/g$. In one embodiment, the specific surface area of the carbon nanotube sponge is about 220 $m^2/g$.

The carbon nanotube sponge of the present invention has excellent adsorption property, and can be used as desiccant. Furthermore, the carbon nanotube sponge can be easily recycled by drying.

The above-described embodiments are intended to illustrate rather than limit the disclosure. Variations may be made to the embodiments without departing from the spirit of the disclosure as claimed. The above-described embodiments illustrate the scope of the disclosure but do not restrict the scope of the disclosure.

Depending on the embodiment, certain of the steps of methods described may be removed, others may be added, and the sequence of steps may be altered. It is also to be understood that the description and the claims drawn to a method may include some indication in reference to certain steps. However, the indication used is only to be viewed for identification purposes and not as a suggestion as to an order for the steps.

What is claimed is:

1. A carbon nanotube sponge comprising:
   a plurality of carbon nanotubes combined by van der Waals force to form a free-standing structure, wherein a plurality of micropores are defined by adjacent carbon nanotubes; and
   a plurality of carboxyl groups and hydroxyl groups located on surfaces of the plurality of carbon nanotubes;
   wherein a weight percentage of the carboxyl groups in the carbon nanotube sponge ranges from about 10% to about 20%, and a weight percentage of the hydroxyl groups in the carbon nanotube sponge ranges from about 5% to about 15%.

2. The carbon nanotube sponge of claim 1, wherein a diameter of the plurality of micropores of the carbon nanotube sponge is greater than 100 micrometers.

3. The carbon nanotube sponge of claim 2, wherein the diameter of the plurality of micropores of the carbon nanotube sponge ranges from 200 micrometers to about 500 micrometers.

4. The carbon nanotube sponge of claim 1, wherein the weight percentage of the carboxyl groups in the carbon nanotube sponge is about 12%.

5. The carbon nanotube sponge of claim 1, wherein the weight percentage of the hydroxyl groups in the carbon nanotube sponge is about 7%.

6. The carbon nanotube sponge of claim 1, wherein a specific surface area of the carbon nanotube sponge is greater than 200 $m^2/g$.

7. The carbon nanotube sponge of claim 1, wherein the carbon nanotube sponge is a honeycomb shaped structure.

* * * * *